United States Patent [19]

Lee et al.

[11] Patent Number: 5,799,007
[45] Date of Patent: Aug. 25, 1998

[54] HIGH DENSITY COMPACT DISC

[75] Inventors: Yong-jae Lee, Uiwang; Byeong-ho Park, Seoul; Kyo-bang Chung, Anyang, all of Rep. of Korea

[73] Assignee: Samsung Electronics Co., Ltd., Kyungki-do, Rep. of Korea

[21] Appl. No.: 689,022

[22] Filed: Jul. 30, 1996

Related U.S. Application Data

[60] Provisional application No. 60/019,891, Jun. 13, 1991.
[51] Int. Cl.$^6$ ........................................... G11B 3/70
[52] U.S. Cl. ............................ 369/275.4; 369/257.5
[58] Field of Search ........................ 369/275.1, 275.3, 369/275.4, 275.5, 100, 109, 44.26

[56] References Cited

U.S. PATENT DOCUMENTS

| | | | |
|---|---|---|---|
| 5,031,162 | 7/1991 | Morimoto et al. | 369/275.2 X |
| 5,608,710 | 3/1997 | Minemura et al. | 369/275.2 X |
| 5,610,879 | 3/1997 | Moriya et al. | 369/275.2 X |

*Primary Examiner*—Paul W. Huber
*Attorney, Agent, or Firm*—Sughrue, Mion, Zinn, Macpeak & Seas, PLLC

[57] ABSTRACT

A high density compact disc having tracks for recording large amounts of information reproducible for a long interval of time is disclosed. In order to increase the track density, a recording surface on a substrate is divided into grooves and lands to thereby form tracks, and pits representing information signals are arranged in both the grooves and the lands. Here, the groove is formed at an optimized predetermined depth, depending on the wavelength of light used to read the information recorded on the disc and the refractive index of a disc substrate, to thereby reduce crosstalk caused by pits of an adjacent groove or land during reproduction. Accordingly, the present invention is effective in enhancing the practicality of the compact disc as a medium for preserving large amounts of information.

3 Claims, 3 Drawing Sheets

HIGH DENSITY COMPACT DISC

This application claims the benefit of copending Provisional Application Ser. No. 60/019891 entitled "High Density Compact Disk." filed on Jun. 13, 1996.

BACKGROUND OF THE INVENTION

The present invention relates to a compact disc for reproduction of information recorded thereon, and more particularly, to a compact disc having a high track density.

An example of a compact disc currently on the market is a video compact disc (video-CD) on which sound, text and images are recorded. The video compact disc, compared to a magnetic recording video cassette tape, has a shorter seek time and is readable with a light source and thus does is not require wearing contact between the medium and the reproducing mechanism during reproduction. This prevents deterioration of information recorded on the disc. However, since the capacity of the video-CD is limited, i.e., approximately 650 MB in the case of a 12 cm disc, the disc cannot store enough image information for long intervals of reproduction. Accordingly, in order to record enough image information for long term reproduction, a high density disc is required.

FIG. 1 shows the structure of a conventional compact disc and a recording format thereof.

The conventional compact disc has a substrate 1, a reflective film 2 and a protective layer 3. A multiplicity of pits 4 comprises units of information and are formed on the substrate 1. Here, the pits 4 are arranged in concentric circles or in a spiral with respect to the center of the disc on tracks having a land portion. When a laser beam 5 from an optical pickup (not shown) is focused onto the reflective film 2 through the substrate 1, a light spot 6 is formed on a recording surface (pit formation surface). When the light spot 6 moves along the pits 4, the reflectivity on the reflective film 2 changes. Accordingly, an electric signal is detected from the change in the reflected light so that it is possible to read both the information recorded on the compact disc and the position information for tracking and focusing of the light spot.

The pitch between the tracks, on which the pits 4 are arranged, is usually 1.6 μm so that the light spot 6 does not overlap the pits of adjacent tracks. Meanwhile, the depth of the pit 4 is approximately ⅕–¼ the wavelength of the light used to read the data from the medium.

In the conventional compact disc, in order to increase the recording density, there is known a method of narrowing the pitch between the tracks, thereby increasing the track density. However, in the case where only the pitch between tracks is narrowed in order to increase the track density, crosstalk occurs due to light interference caused by the pits in adjacent tracks, generating noise in the reproduction signal. Also, in the recording format of the conventional compact disc, since the pits of a track adjacent to a target track are arranged in a random manner, the crosstalk cannot be suppressed. Accordingly, in order to increase the track density, it is necessary to change the recording format of the conventional compact disc.

SUMMARY OF THE INVENTION

It is an object of the present invention to provide a high density compact disc having a high track density for recording information for long periods of reproduction.

Also, it is another object to provide a high density compact disc having a high track density in which crosstalk does not occur during reproduction.

To accomplish the above objects of the present invention, there is provided a high density compact disc comprising a recording surface on which pits representing information signals are arranged along a predetermined track, wherein the recording surface comprises grooves and lands alternately arranged along the tracks, and the pits are formed on both the grooves and the lands.

Preferably, the depth of the grooves is within the range of $$\frac{\lambda}{7\eta} \text{ through } \frac{\lambda}{6\eta}$$

where λ is the wavelength of light used to read information recorded on the disc and η is the refractive index of a disc substrate.

BRIEF DESCRIPTION OF THE DRAWINGS

The above objects and advantages of the present invention will become more apparent by a detailed description of a preferred embodiment thereof with reference to the attached drawings in which.

DETAILED DESCRIPTION OF THE INVENTION

Figure 1:
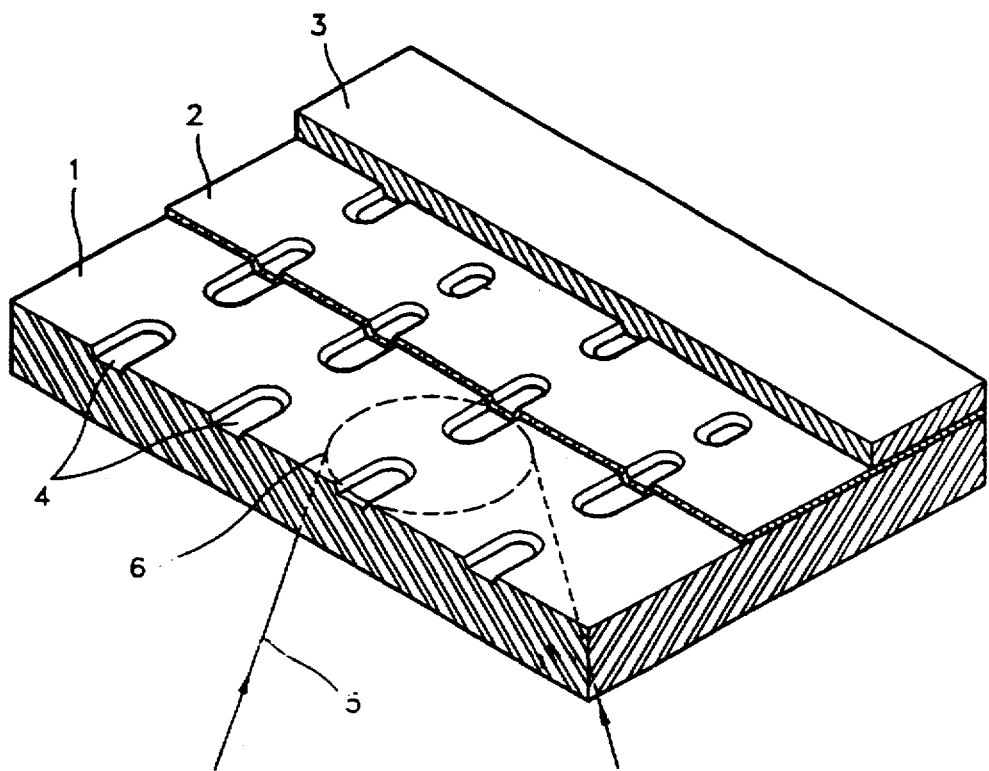
FIG. 1 is a partial perspective view showing both the structure and the recording format of a conventional compact disc.

Referring to the drawings, a preferred embodiment for realizing a high density compact disc according to the present invention will be described in detail.

Figure 2:
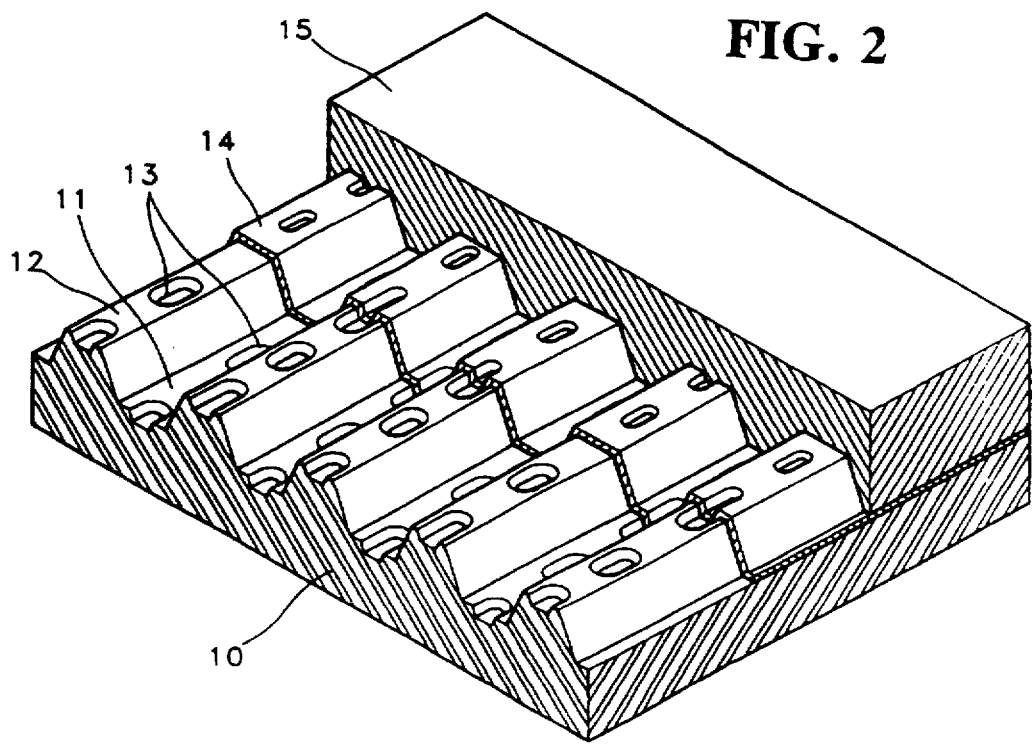
FIG. 2 is a partial perspective view showing both the structure and the recording format of a high density compact disc according to an embodiment of the present invention.
Figure 3:
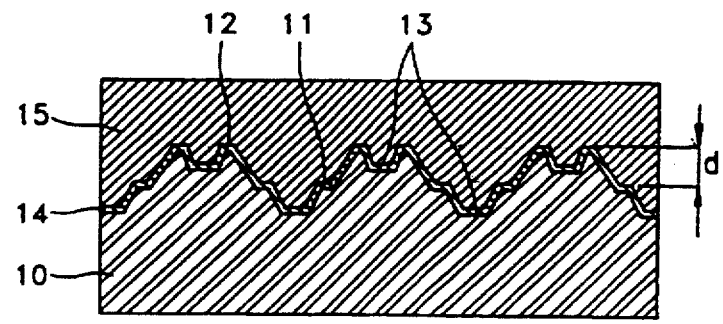
FIG. 3 is a sectional view of the compact disc of FIG. 2.

Referring to FIGS. 2 and 3, reference numeral 10 denotes a transparent substrate having a predetermined refractive index, which transmits the laser light for reading information recorded on the disc. The substrate 10 has a recording surface formed on the upper surface thereof. The recording surface is formed with a plurality of grooves 11 and lands 12 which are adjacent to each other along tracks formed in concentric circles or in a spiral with respect to the center of the disc. Information is recorded on a series of pits 13 formed in the grooves 11 and the lands 12, each pit representing a unit information signal. A reflective film 14, such as a metal lamina for reflecting the laser light, is coated on the recording surface of the substrate 10 on the grooves 11 and the lands 12. A protective layer 15 is formed on the reflective film 14.

If the interval between the adjacent grooves 11 or the adjacent lands 12 is the same as the pitch between the tracks of the conventional compact disc, the track density obtained with the present invention is twice as dense as that of the conventional format. In this state, when a laser beam is projected and focused onto a target groove from the optical pickup, a light spot formed on the recording surface partially hits two lands 12 at both sides of the target groove 11 (see FIGS. 4A and 4B).

Here, crosstalk due to pits 13 in the land 12 may occur. However, according to the present invention, the level of crosstalk can be reduced by optimizing the recording format by adjusting the depth d of the groove 11, based on conditions to be described below.

Figure 4:
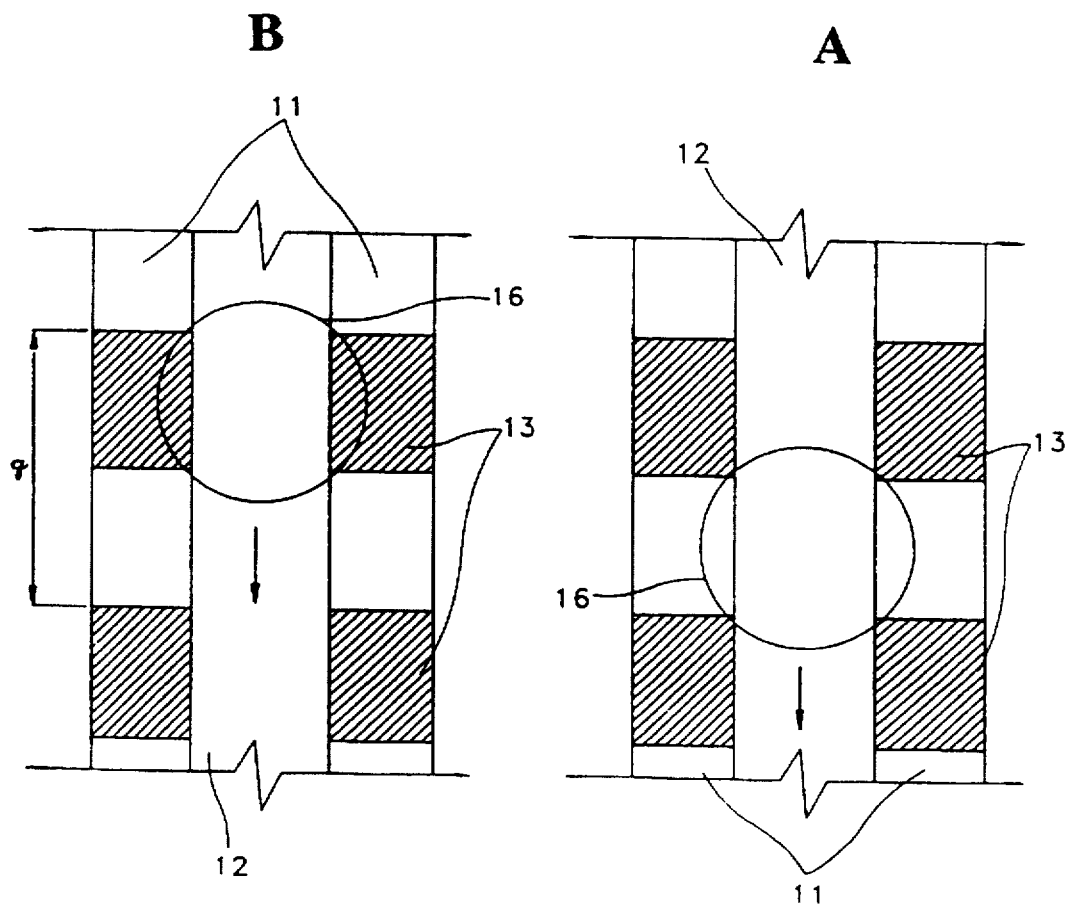
FIGS. 4A and 4B are schematic views for illustrating a method for optimizing the groove depth of the high density compact disc according to the present invention.

Crosstalk can be illustrated by interference in light reflected from the groove region and light reflected from the land region. For example, as shown in FIGS. 4A and 4B, if the pits 13 are arranged only in the grooves 11 by predetermined size and in intervals of q, and no information is recorded on the land region 12, and the light spot 16 moves along a center of the land 12 region, the intensity of the reflected light changes according to the pit 13 formed on the adjacent groove 11 and at a period of the interval q. That is, the amplitude of the change in the intensity can be defined as the crosstalk.

In the case that the light spots 16 are located at positions shown in FIGS. 4A and 4B, respectively, the phase differences between the reflected light in the groove 11 region and the land 12 region can be expressed as:

$$\frac{4\pi}{\lambda} d,$$

and $$\frac{4\pi}{\lambda} d + \pi$$

respectively, wherein $\lambda$ is the wavelength of the laser beam, and d is the depth of the groove 11.

The conditions for reducing the degree of interference in the phase differences are as follows.

$$\cos\left(\frac{4\pi}{\lambda} d\right) = \cos\left(\frac{4\pi}{\lambda} d + \pi\right)$$

$$d = \frac{\lambda}{8}$$

Also, in the case where pits 13 are arranged only in the lands 12 and the light spot 16 is focused on the center of a groove 11, the conditions for reducing the degree of interference in the phase differences are as follows, where the result is the same as that of the above case.

That is, when the depth d of the groove 11 is approximately ⅛ the wavelength $\lambda$ of the light, crosstalk is at a minimum.

$$\cos\left(\frac{4\pi}{\lambda} d\right) = \cos\left(\frac{4\pi}{\lambda} d - \pi\right)$$

$$d = \frac{\lambda}{8}$$

The above result is a simplified example of the recording formats of the high density compact disc, where the refractive index of the above-mentioned substrate is not considered.

Figure 5:
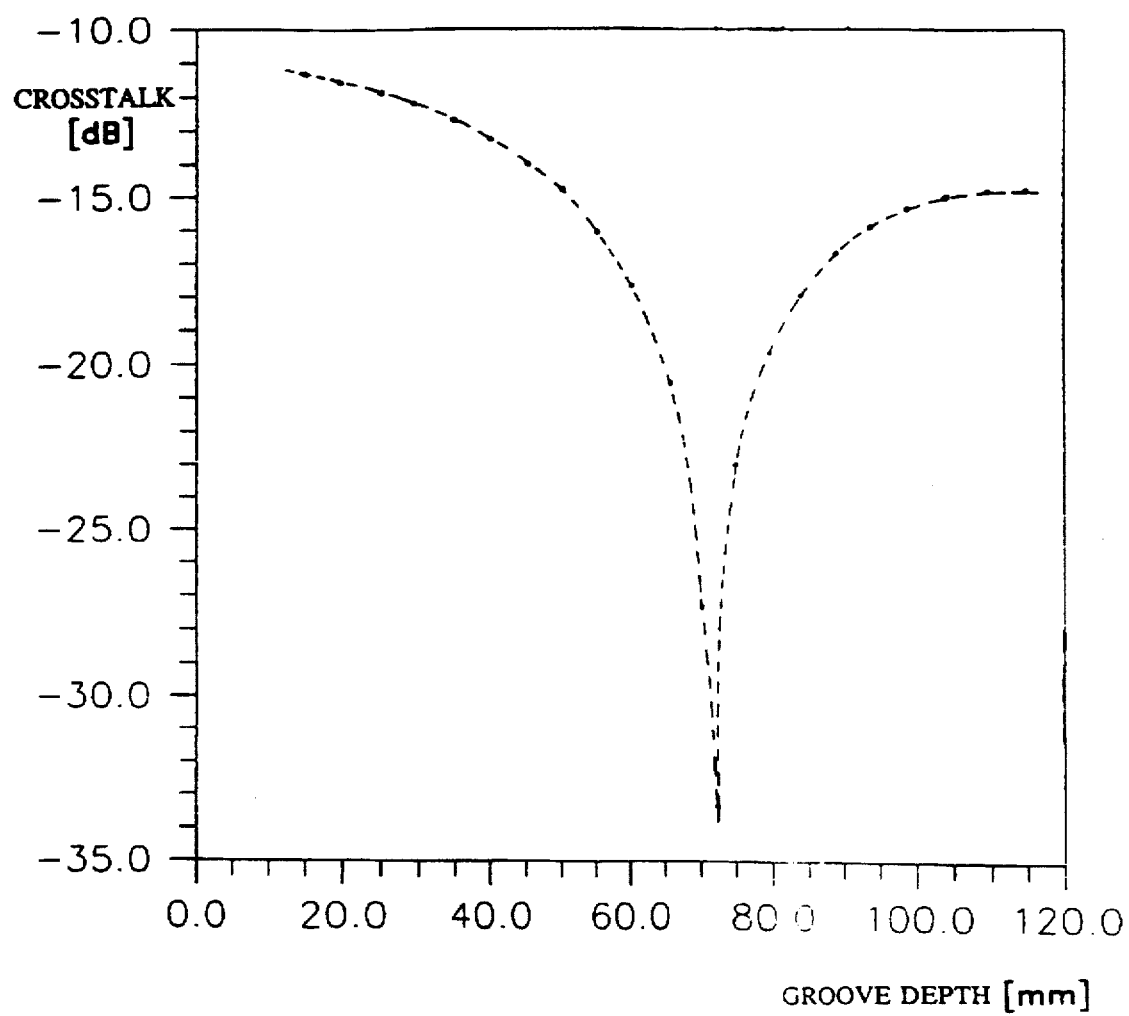
FIG. 5 is a graph showing the level of crosstalk with respect to the groove depth in the high density compact disc according to the present invention.

The following are actual conditions which may be applied. These are data for measuring the level of crosstalk according to the depth of the groove by a computer simulator, based on the theory of diffraction by Hopkins.
  wavelength $\lambda$ of laser: 680 nm
  aperture of an object lens: 0.6
  width of groove and land: 0.7 μm
  track pitch: 1.4 μm
  interval of pits: 1.1 μm
  pit depth: $\lambda/4\eta$ ($\eta$=1.51, the refractive index of substrate)
  pit length: 0.55 μm
  pit width: 0.5 μm The level of crosstalk measured as a function of the groove depth is shown by the graph of FIG. 5. On the graph, the unit along the horizontal axis shows the groove depth in nm, and the unit along the vertical axis shows the level of crosstalk in dB. According to the graph, when the groove depth is approximately 70 nm, i.e. within the range $\lambda/7\eta$–$\lambda/6\eta$, the crosstalk is reduced significantly. In this range, $\eta$ represents the refractive index of the disc substrate. Here, the level of crosstalk changes depending on the form of the pits of an adjacent track, however, the level of crosstalk is small enough that the variations are insignificant.

As described above, according to the present invention, tracks are divided into grooves and lands, where pits representing information signals are formed in both the grooves and lands, to thereby double the track density over the conventional compact disc. The present invention provides a high density compact disc reproducible for a long interval without noise due to crosstalk. Accordingly, the present invention is effective in enhancing the practicality of the compact disc as a medium for preserving large amounts of sound, character and image information.

Also, in the high density compact disc according to the present invention, tracking signals can be simply detected from changes in the light intensity due to the depth of both grooves and lands. Thus, the tracking control by a push-pull method, which could not be adopted for the conventional compact disc, is possible, and a light pickup optical system can be simplified.

What is claimed is:

1. A high density compact disc comprising a recording surface readable by a light source, the recording surface being arranged with a plurality of tracks, wherein each of said plurality of tracks further comprises a plurality of alternating grooves and lands along said track, and wherein said grooves and lands contain pits corresponding to information recorded on the disc;

wherein the depth of said grooves is approximately equal to $\lambda/8$, where $\lambda$ is the wavelength of light used to read information recorded on the disc; and wherein the depth of said grooves is measured as the vertical distance from the top surface of the bottom of a pit formed in a land to the top surface of a groove.

2. A high density compact disc readable by a light source comprising:

a transparent substrate, said transparent substrate being formed in a plurality of tracks, wherein each of said plurality of tracks has alternating lands and grooves along said track, and wherein said lands and grooves contain pits corresponding to information recorded on the disc, wherein the depth of said grooves is approximately $\lambda/8$, where $\lambda$ is the wavelength of light used to read information recorded on the disc; and wherein the depth of said grooves is measured as the vertical distance from the top surface of the bottom of a pit formed in a land to the top surface of a groove.

3. A high density compact disc comprising a recording surface readable by a light source, the recording surface being arranged with a plurality of tracks, wherein each of said plurality of tracks further comprises a plurality of alternating grooves and lands along said track, and wherein said grooves and lands contain pits corresponding to information recorded on the disc, wherein the vertical spacing between a top surface of a groove and a bottom of a pit formed in a land is within the range of $$\frac{\lambda}{7\eta} \text{ through } \frac{\lambda}{6\eta}$$

where $\lambda$ is the wavelength of light used to read information recorded on the disc and $\eta$ indicates the refractive index of a disc substrate.

* * * * *